United States Patent
Zhao et al.

(10) Patent No.: US 8,958,423 B2
(45) Date of Patent: Feb. 17, 2015

(54) IMPLEMENTING A MULTICAST VIRTUAL PRIVATE NETWORK BY USING MULTICAST RESOURCE RESERVATION PROTOCOL-TRAFFIC ENGINEERING

(75) Inventors: Katherine Zhao, San Jose, CA (US); Renwei Li, Fremont, CA (US); Lin Han, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 224 days.

(21) Appl. No.: 13/539,150

(22) Filed: Jun. 29, 2012

(65) Prior Publication Data
US 2014/0003425 A1    Jan. 2, 2014

(51) Int. Cl.
  *H04L 12/28*    (2006.01)
  *H04L 12/761*    (2013.01)
(52) U.S. Cl.
  CPC ..................................... *H04L 45/16* (2013.01)
  USPC ......................................................... 370/390
(58) Field of Classification Search
  CPC ..................................................... H04L 45/16
  USPC .............................. 370/392, 395.2, 401, 408
  See application file for complete search history.

(56) References Cited

U.S. PATENT DOCUMENTS

| | | | |
|---|---|---|---|
| 6,795,445 B1 * | 9/2004 | Kabie et al. ................... | 370/401 |
| 7,519,010 B1 | 4/2009 | Aggarwal et al. | |
| 7,948,986 B1 | 5/2011 | Ghosh et al. | |
| 8,160,076 B1 * | 4/2012 | Aggarwal et al. .......... | 370/395.5 |
| 8,488,614 B1 * | 7/2013 | Aggarwal .................. | 370/395.3 |
| 2008/0219264 A1 * | 9/2008 | Wijnands et al. ............. | 370/392 |
| 2013/0177018 A1 * | 7/2013 | Wijnands et al. ............. | 370/390 |

FOREIGN PATENT DOCUMENTS

CN    102170710 A    8/2011

OTHER PUBLICATIONS

Internet Engineering Task Force (IETF), Network Working Group, Internet-Draft, Receiver-Driven Multicast Traffic Engineered Label Switched Paths draft-lzj-mpls-receiver-driven-multicast-rsvp-te-00.txt, Mar. 4, 2012, total pp. 23.*
Han, L, Ed., et al., "Multicast VPN Support by Receiver-Driven Multicast Extensions to RSVP-TE," draft-hlj-l3vpn-mvpn-mrsvp-te-00, Jul. 6, 2012, 30 pages.
Foreign Communication From a Related Counterpart Application, PCT Application PCT/US2012/045137, International Search Report dated Oct. 9, 2012, 5 pages.

(Continued)

*Primary Examiner* — Un C Cho
*Assistant Examiner* — Peter Mak
(74) *Attorney, Agent, or Firm* — Conley Rose, P.C.; Grant Rodolph; William H. Dietrich (57) ABSTRACT

In a network node positioned inside a Multiprotocol Label Switching (MPLS) core network, a method of establishing a multicast Virtual Private Network (MVPN) comprising receiving a packet for multicast data from a Virtual Private Network (VPN) via a provider edge (PE) node positioned on the edge of the MPLS core network, wherein the network node is a root node and the PE node is a leaf node of a multicast Label Switched Path (mLSP) established in the MPLS core network, swapping an upstream label in the packet that is assigned to the PE node with a downstream label assigned to a next hop of the mLSP, and forwarding the packet to the next hop.

24 Claims, 8 Drawing Sheets

(56) References Cited

OTHER PUBLICATIONS

Foreign Communication From a Related Counterpart Application, PCT Application PCT/US2012/045137, Written Opinion dated Oct. 9, 2012, 16 pages.

Li, R., et al., "Receiver-Driven Multicast Traffic Engineered Label Switched Paths," draft-lzj-mpls-receiver-driven-multicast-rsvp-te-00.txt, Mar. 4, 2012, 27 pages.

* cited by examiner

IMPLEMENTING A MULTICAST VIRTUAL PRIVATE NETWORK BY USING MULTICAST RESOURCE RESERVATION PROTOCOL-TRAFFIC ENGINEERING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths. Some networks implement Virtual Private Networks (VPNs), a scheme that logically interconnects remote (and often geographically separate) networks through public communication infrastructures, such as the Internet, or other core networks. Multicast VPN (MVPN) is a technology to deploy multicast services across existing VPNs or as part of a transportation infrastructure. A mechanism, such as a Protocol-Independent Multicast (PIM), may be used to carry MVPN multicast routing information and multicast traffic (at a data plane) and enable the flow of multicast traffic from the sources to the receivers.

A MVPN may be established using a core network, such as a Multiprotocol Label Switching (MPLS) core network, also referred to herein as a MPLS core. MPLS is a mechanism that directs data from one network node to the next based on short path labels instead of longer network addresses to avoid complex lookups in an address based routing table. The labels may identify virtual links (paths) between distant nodes rather than endpoints. In MPLS packets of various network protocols, such as Internet Protocol (IP) packets, may be encapsulated. The MVPN may be established to allow an enterprise to transparently interconnect a VPN across the MPLS core. As such, the MPLS core may serve as an overlay network for the MVPN, which may simplify MVPN control plane messaging and data plane packet forwarding.

A multicast Label Switched Path (mLSP) may be a shared MPLS tree that defines a plurality of paths used by a plurality of provider edge (PE) routers or nodes within the same MVPN domain to transport control messages and multicast data between one another. The mLSP may serve as a multicast distribution tree in a network and may be receiver initiated and Quality-of-Service (QoS) demanding. Setting up the mLSP efficiently in the network may be challenging due to multiple needed exchanges between the different components involved. Resource Reservation Protocol-Traffic Engineering (RSVP-TE) may be used in the setup of the multicast distribution tree to provide the QoS service required. However, RSVP-TE may need the knowledge of the locations of all receivers for the tree prior to the tree setup. Thus, a receiver discovery protocol may also be needed, such as a Border Gateway Protocol (BGP), to discover all the involved receivers. Further, a substantial number of PATH and RESV messages, as defined in the RSVP-TE protocol, may be exchanged during the tree setup, which may consume substantial network resources (e.g., bandwidth) and thus negatively affect performance.

SUMMARY

In one embodiment, the disclosure includes in a network node positioned inside a MPLS core network, a method of establishing a MVPN comprising receiving a packet for multicast data from a VPN via a PE node positioned on the edge of the MPLS core network, wherein the network node is a root node and the PE node is a leaf node of a mLSP established in the MPLS core network, swapping an upstream label in the packet that is assigned to the PE node with a downstream label assigned to a next hop of the mLSP, and forwarding the packet to the next hop.

In another embodiment, the disclosure includes in a network node positioned on the edge of a MPLS core network, a method of establishing a MVPN comprising receiving a packet for multicast data from a VPN, adding an upstream label to the packet that is assigned to the network node by a second network node positioned inside the MPLS core network, wherein the network node is a leaf node and the second network node is a root node of a mLSP established in the MPLS core network; and forwarding the packet to a next hop of the mLSP.

In another embodiment, the disclosure includes a network component for supporting a MVPN in a MPLS core network, the network component comprising a processor configured to receive a packet for multicast data from a VPN via a PE node positioned on the edge of the MPLS core network, wherein the network component and the PE node belong to a mLSP established in the MPLS core network, swap an upstream label in the packet that is assigned to the PE node with a downstream label assigned to a next hop of the mLSP, and forward the packet to the next hop.

In yet another embodiment, the disclosure includes a network component for supporting a MVPN in a Multiprotocol MPLS core network, the network component comprising a processor configured to receive a packet for multicast data from a VPN, adding an upstream label to the packet that is assigned to the network component by a root node positioned inside the MPLS core network, wherein the network component and the root node belong to a mLSP established in the MPLS core network, and forwarding the packet to a next hop of the mLSP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for creating a mLSP for one or more VPNs connected to a MPLS core that serves as an overlay network. The method may set up transport in the MVPN, so that control messages and user data from a VPN may be transferred to another location efficiently over the MPLS core. The system and method may comprise implementing a MVPN using a mRSVP-TE protocol. The mRSVP-TE protocol is a multicast RSVP-TE with a receiver driven extension and has been proposed in the Internet Engineering Task Force (IETF) draft entitled "draft-lzj-mpls-receiver-driven-multicast-rsvp-te-00.txt", which is incorporated herein by reference.

The system and method may use mRSVP-TE to establish a mLSP within the MPLS core. The mLSP may be shared between a plurality of networks coupled to the PE nodes. A MPLS core may have at least one default mLSP and optionally one or more data mLSPs for improved performance. The default mLSP may be used for PIM signaling and relatively low rate or bandwidth data traffic while the data mLSP(s) may be used for relatively high rate or bandwidth data. The disclosed mRSVP-TE system and method for creating a mLSP within the MPLS may be an improved solution to establish a MVPN over a MPLS core and may not require a receiver discovery protocol (e.g., BGP) or a PIM protocol to carry MVPN multicast routing information and multicast traffic.

Figure 1:
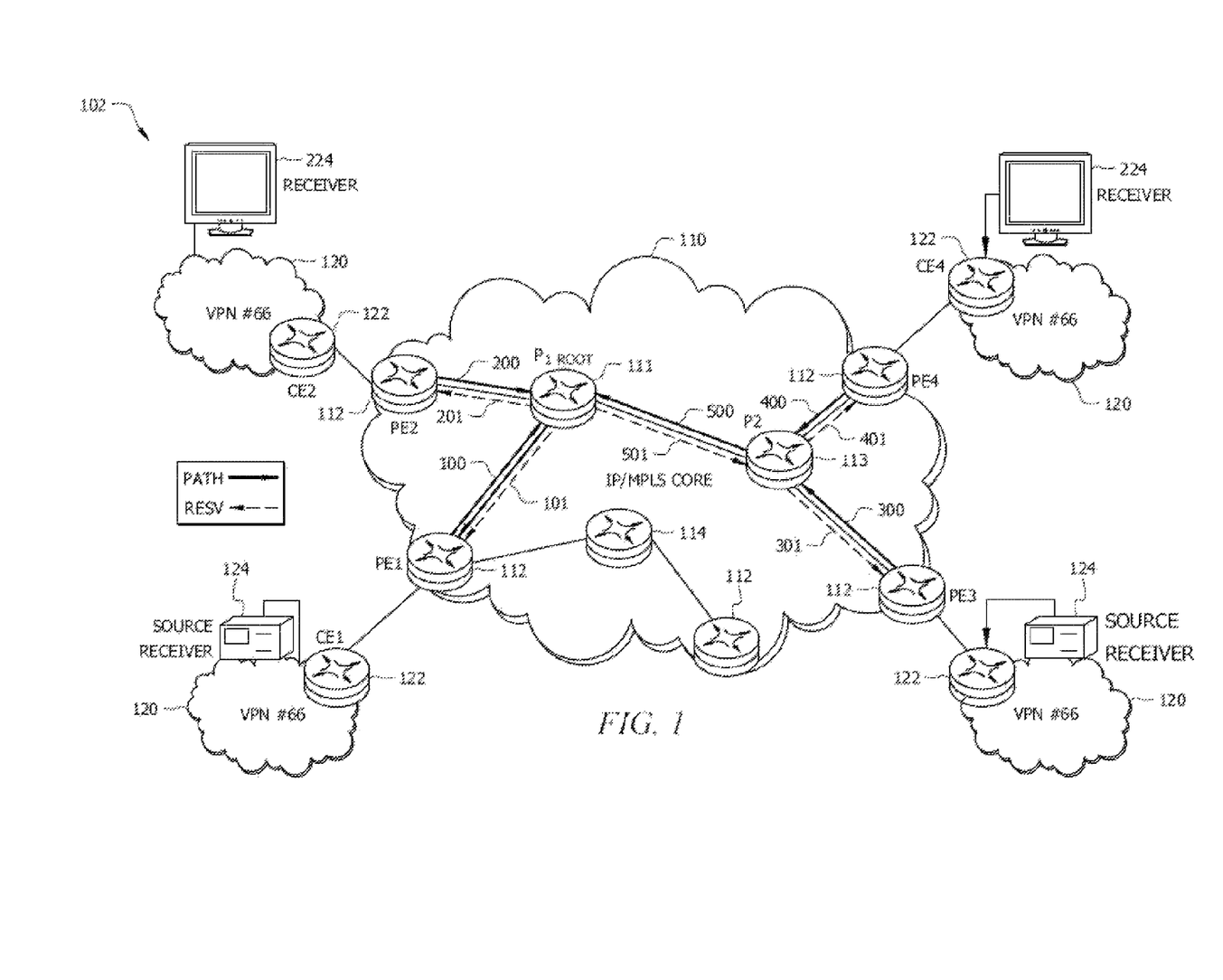
FIG. 1 is a schematic diagram of an embodiment of a mLSP creation scheme using mRSVP-TE.

FIG. 1 illustrates an embodiment of a mLSP creation scheme 102 using mRSVP-TE. The scheme 102 may be implemented in an MPLS core 110, which may be any network configured to implement MPLS and transport IP packets or similar packets. The MPLS core 110 may comprise a plurality of nodes, which may be configured to transport data packets in the MPLS core. For example, the nodes may include routers, switches, bridges, or combinations thereof. The nodes may comprise a plurality of PE nodes 112 (labeled PE1, PE2, PE3, and PE4), which may be positioned on the edge of the MPLS core 110, a root node 111 (labeled P1 root) located in the MPLS core 110 and coupled to the PE nodes 112 directly or via one or more intermediate nodes 113 (labeled P2). The nodes may also comprise other internal nodes 114 in the MPLS core 110. The root node 111 and the PE nodes 112 may be configured to forward packets using labels in the packets based on the MPLS protocol. The root node 111 may serve as the root of the mLSP tree and the PE nodes 112 may be the leaves of the tree. The PE nodes 112 may be coupled to a plurality of corresponding external networks 120, which may be IP networks or any other type of communications networks configured to exchange data (e.g., in the form of packets) via the MPLS core 110.

A MVPN may be established across the external networks 120 and connected via the MPLS core 110. The MVPN may be established to connect a VPN (labeled VPN #66) at the external networks 120 into a single virtual network. Each external network 120 may be coupled to a user equipment (UE) 124 and may comprise a customer edge (CE) node 122 coupled to a corresponding PE node 112. The CE nodes 122 (labeled CE1, CE2, CE3, and CE4) may be positioned on the edges of the corresponding external networks 120 and may be any nodes configured to transport data or packets, such as routers, bridges, or switches. The CE nodes 122 may forward multicast data or packets from and to the corresponding UE 124 via the PE nodes 112. The data may be MVPN traffic transported, via the PE nodes 112 and the MPLS core 110, between the UE 124 and the CE nodes 122 of the different external networks 120. The UE 124 may be a source of the multicast traffic or a receiver of the multicast traffic. The UEs 124 may be any user operated communication devices, such as desktop computers, laptop computers, or other fixed user devices that may be coupled to the corresponding external networks 120 via fixed (wired) links. The UEs 124 may also include wireless communications devices that may be coupled to the external networks 120 via wireless links, such as smartphones, laptop computers, and/or tablet computers. Other examples of the UEs 124 include set top boxes, television/video receivers, game consoles, and similar media/entertainment devices.

The multicast traffic of the MVPN may be transported in the MPLS core over an established mLSP. A mLSP may be created for one or more MVPNs established across the external networks 120 and the MPLS core 110. To set up the mLSP in the MPLS 110, each PE node 112 may send to the root node 111 a mRSVP-TE PATH message to join the mLSP. The PATH message may be forwarded in the MPLS core 110 hop by hop from the PE node 112 to the root node 111. After receiving the PATH message, the root node 111 may return a mRSVP-TE RESV message to the PE node 112. As such, a sub-LSP (a path or branch of the mLSP tree) may be established along the network nodes that forward the PATH and RESV message from the PE node 112 to the root node 111. The PATH message and similarly the returned RESV message may comprise a VPN ID, a multicast source address, a group address and a root address in a SESSION object, as defined in the mRSVP protocol. The VPN ID may indicate the VPN of the external networks 120. The multicast source address may indicate the network address (e.g., IP or Media Access Control (MAC) address), of the source UE 124. The group address may be a network address (e.g., IP address) of a group of nodes that belong to a multicast domain or group. The root address may be a network address (e.g., IP or MAC address) of the root node 111.

Additionally, the PATH message for each PE node 112 may indicate a downstream label corresponding to that PE node 112, which may be used for multicast downstream traffic in the established mLSP. The returned RESV message for each PE node 112 may also indicate an upstream corresponding to that PE node 112, which may be used for multicast upstream traffic in the established mLSP. The downstream labels for each PE nodes 112 may be assigned by that PE node 112 and the upstream label for all the PE nodes 112 may be assigned by the root node 111. The downstream labels may be 100, 200, 300, and 400 for PE1, PE2, PE3, and PE4 respectively, and the upstream labels may be 101, 201, 301, and 401 for PE1, PE2, PE3, and PE4 respectively. At least some of the information sent in the PATH and RESV messages may be maintained in the PE nodes 112 and the root node 111 (e.g., in a local forwarding or binding table) to bind and forward the incoming multicast traffic from the VPN at the external networks 120 on the established paths of the mLSP. The incoming multicast packets may comprise information that may be matched to the locally maintained information at the PE nodes 112 and the root node 111 to properly forward the multicast traffic along the mLSP, as described below. The mLSP creation may be triggered by MVPN configuration on each of the PE nodes 112 that need to be added to or join the mLSP. The PATH messages may be sent from the configured PE nodes 112 to be added to the mLSP and hence join the MVPN at any time upon demand or need. Other PE nodes 112 that are not configured may not send PATH messages and may be excluded from joining the mLSP.

Figure 2:
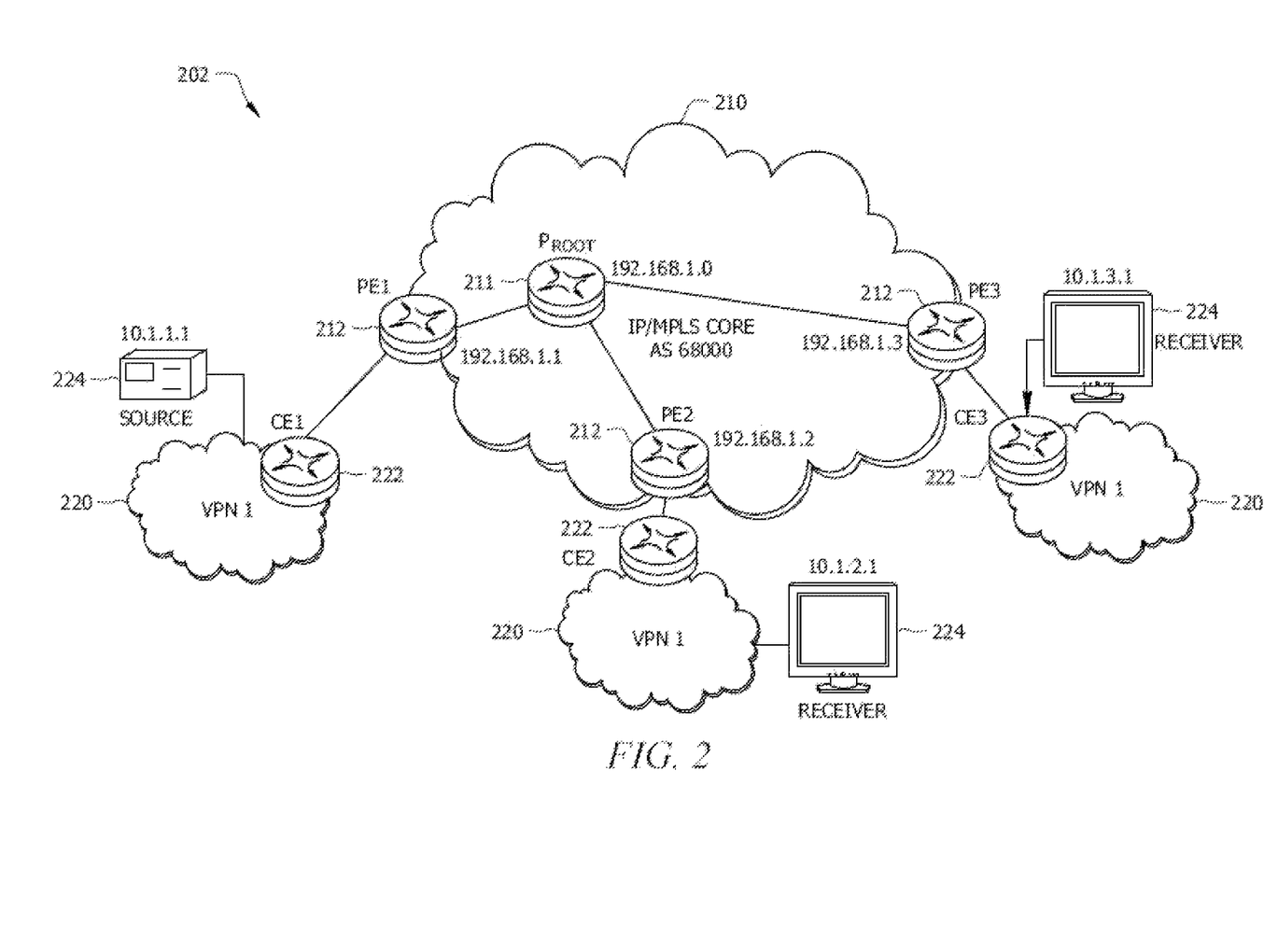
FIG. 2 is a schematic diagram of an embodiment of a MVPN.

FIG. 2 illustrates an embodiment of a MVPN 202 that may be created or connected via a MPLS core 210 by establishing a mLSP across the MPLS core 210. The MPLS 210 may be similar to the MPLS core 110 and may comprise similar nodes, including a root node 211 (labeled P root) similar to the root node 111 and a plurality of PE nodes 212 (labeled PE1, PE2, and PE3) similar to the PE nodes 212. The PE nodes 212 may be coupled to a plurality of corresponding external networks 220. The external networks 220 may be similar to the external networks 120 and may each comprise a CE node 222 similar to the CE node 122 and a UE 224 similar to the UE 124. The MVPN 202 may be established across the external networks 220 by connecting a VPN (labeled VPN 1) via the MPLS core 210.

Figure 3:
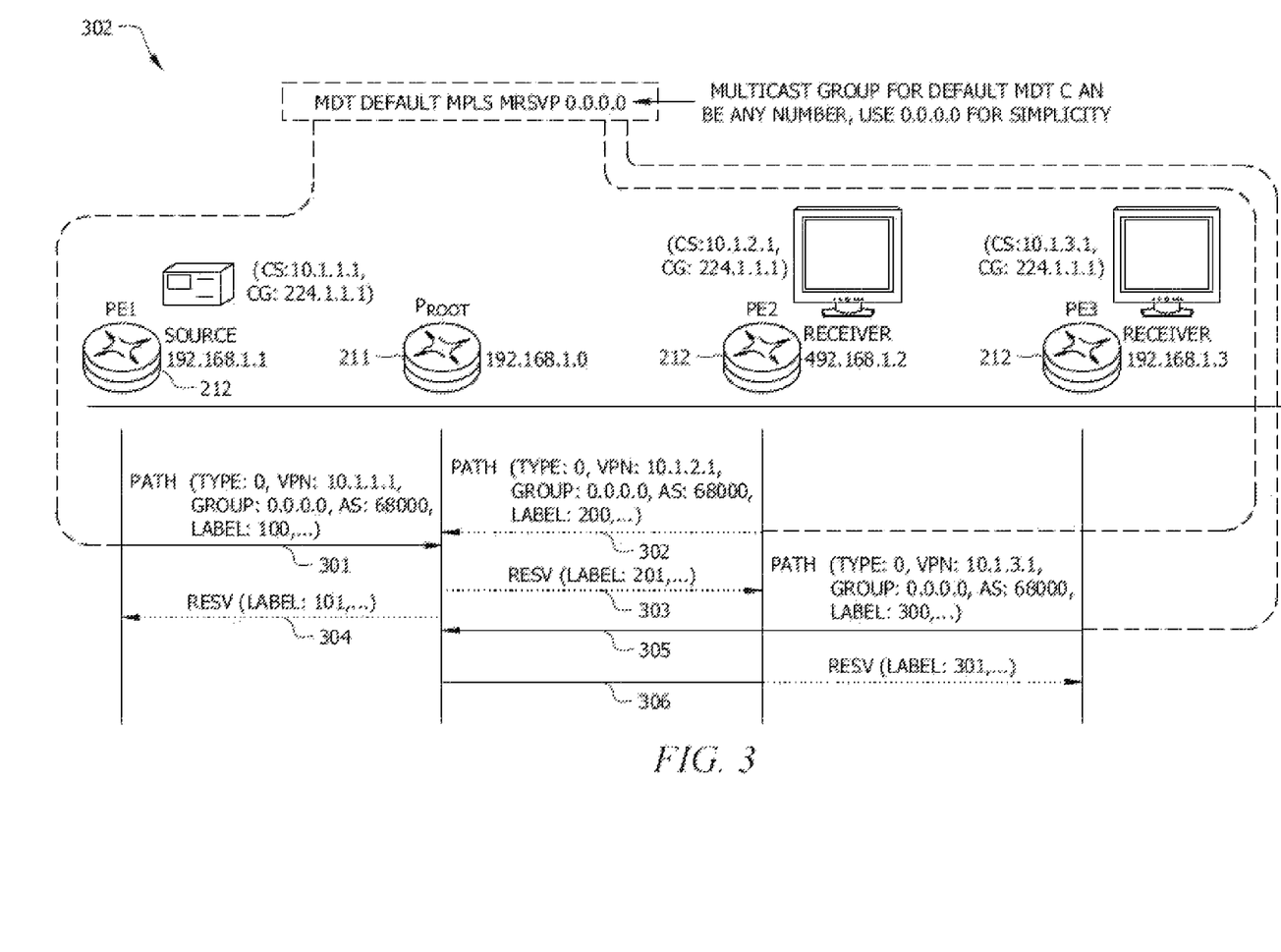
FIG. 3 is a protocol diagram of an embodiment of a mLSP creation method using mRSVP-TE for the MVPN of FIG. 2.

FIG. 3 illustrates a mLSP creation method 302 using mRSVP-TE for the MVPN 202. The mLSP creation method 302 may be implemented by any PE nodes 212 that needs to join the mLSP for the MVPN 202. For instance, at step 301, PE1 may send a PATH message to P root to establish a sub-LSP (a path or branch) of the mLSP from PE1 to P root. The PATH message may indicate a type of the message. For example, a type field may be set to zero to indicate a mRSVP-TE PATH message. The PATH message may also comprise a VPN source address (e.g., an IP source address 10.1.1.1), a group address (e.g., an IP group address 0.0.0.0.), an Autonomous System (AS) ID that indicates an AS domain (e.g., 68000), and an upstream label for PE1 (e.g., 100). The PATH message may also comprise other path binding information (VPN ID, root address, etc.) as described above. Similarly, at step 302, PE2 may send another PATH message to P root to establish another corresponding sub-LSP from PE2 to P root. At step 303, P root may return a RESV message to PE2 that indicates a downstream label for PE2 (e.g., 201). Similarly, at step 304, P root may return another RESV message to PE1 that indicates a downstream label for PE1 (e.g., 101). At step 305, PE3 may send a corresponding PATH message to P root to establish a corresponding sub-LSP from PE3 to P root. At step 306, P root may return a RESV message to PE3 that indicates a downstream label for PE3 (e.g., 301). The PATH messages and the corresponding returned RESV messages may be exchanged between the different PE nodes 212 and the root node 211 in any order.

The exchanged upstream and downstream labels in the PATH and RESV messages may be unidirectional labels, where a different label may be used for each of the upstream and downstream directions along the same sub-LSP or branch. Alternatively, the exchanged upstream and downstream labels may be bidirectional labels, where the same label may be used for both the upstream and downstream directions along the same sub-LSP or branch. Further, the mLSP may serve as a point-to-multipoint (P2MP) LSP to multicast data from a source to multiple destinations or as a multipoint-to-multipoint (MP2MP) LSP to multicast data from multiple sources to multiple destinations, via the corresponding PE nodes 212.

In an embodiment, the mLSP creation method based on the mRSVP-TE protocol (using the mRSVP PATH and RESV messages) may comprise a plurality of steps. At a first step for pre-configuring a PE node, a router (or any other suitable network node) may be selected in the MPLS core as a root for creating the mLSP. The configuration step may also comprise enabling RSVP forwarding in the MPLS, creating a Virtual Routing and Forwarding (VRF) and a route distinguisher (RD) instance for a MVPN associated with the PE node, and configuring an export/import route and a targeted extended community. Next, a default multicast group may be configured to trigger mRSVP-TE PATH and RSVP signaling and establish LSP tunnels (or paths). This configuration step may also comprise preparing a SESSION object, a SENDER-TEMPLATE object, and a L2S-SUB-LSP object to carry a VPN ID, a mLSP ID, an upstream label, a downstream label, a multicast source address, a default group address, a root address, or combinations thereof as defined in the mRSVP-TE protocol. Next, a PATH message may be sent from the PE node to a next hop towards the root node. This may be repeated on each of the intermediate hops until the root node is reached. The PATH message may be suppressed or discarded if the intermediate node is a branch point and has previously received a PATH message for the same session. The steps above may be repeated for each PE node (each leaf of the multicast tree) until a complete mLSP joining all intended PE nodes is created.

Figure 4:
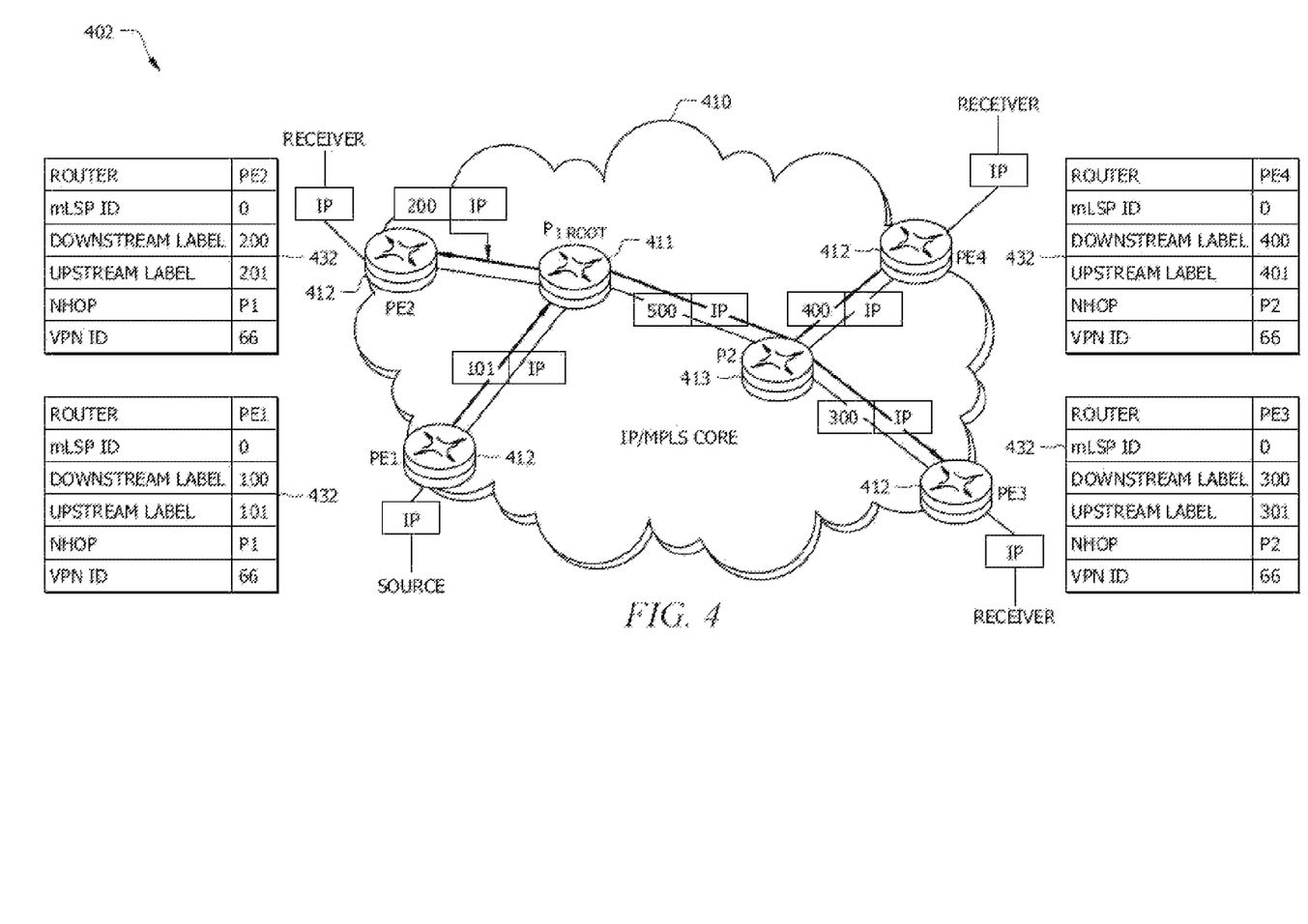
FIG. 4 is a schematic diagram of an embodiment of a multicast data forwarding scheme over a mLSP.

FIG. 4 illustrates an embodiment of a multicast data forwarding scheme 402 over a mLSP. The mLSP be may be created across a MPLS core 410 for establishing a MVPN as described above. The mLSP may be established between a root node 411 (labeled P1 root) and a plurality of PE nodes 412 (labeled PE1, PE2, PE3, and PE4) in the MPLS core 410, which may be configured similar to the corresponding components above. The mLSP may also comprise one or more intermediate nodes 413 (labeled P2) positioned between the root node 411 and the PE nodes 412. After the mLSP is established, the root node 411 and the PE nodes 412 may maintain the bindings between the VPN of the external networks and the corresponding MPLS labels (downstream and upstream labels). The binding information for each PE node 412 (and similarly the root node 411) may be maintained in a corresponding local MPLS binding table 432 for each of the nodes. Multicast data may be forwarded over the mLSP, which may serve as a P2MP LSP (for multicasting traffic from a source to multiple receivers) or as a MP2MP mLSP (for multicasting traffic from multiple sources to multiple receivers).

The MPLS binding table 432 for each PE node 412 may comprise a mLSP ID, which may be the same for all the PE nodes 412 of the same mLSP, a downstream label and an upstream label assigned to each individual PE node 412, a next hop (NHOP) address or indicator that indicates the next hop towards the root node 411 in the sub-LSP or branch for each PE node 412, and a VPN ID, which may be the same for all the PE nodes 412 associated with the same MVPN or VPN. For example, the mLSP ID may be zero, the VPN ID may be 66, the downstream labels may be 100, 200, 300, and 400 for PE1, PE2, PE3, and PE4 respectively, the upstream labels may be 101, 201, 301, and 401 for PE1, PE2, PE3, and PE4 respectively, and the next hop may be P1 for PE1 and PE2, and PE2 for PE3 and PE4.

An example of a multicast data forwarding and distribution using the MLSP is shown in FIG. 2, where a data packet arrives on PE1 (e.g., from a source in an external network that is not shown). Using a local MPLS binding table 432, PE1 may encapsulate the packet with its assigned upstream label (101) and forward the packet to the indicated next hop (P1 root) over the mLSP. The packet received at PE1 may comprise the source address, a multicast IP address, the mLSP ID, the VPN ID, or combinations thereof. When P1 root receives the packet, P1 root may swap the upstream label with a downstream label for each next hop on the downstream using a local MPLS binding table, which may comprise similar information as the MPLS binding tables 432 for all the next hops. For each next hop, P1 root may remove the upstream label in the incoming data packet, encapsulate the packet with an assigned downstream label, and forward the packet to the indicated next hop over the mLSP. At each next hop, the downstream label may be swapped until the packet arrives to each of the PE nodes 412, which may then remove the downstream label in the received packet and forward the packet towards the VPN in the external network. Thus, the use of labels may be transparent to the VPNs at the external networks. The multicast data forwarding scheme 402 may be implemented by a forwarding engine (hardware), a forwarding logic (software), or both at each of the nodes of the mLSP.

Figure 5:
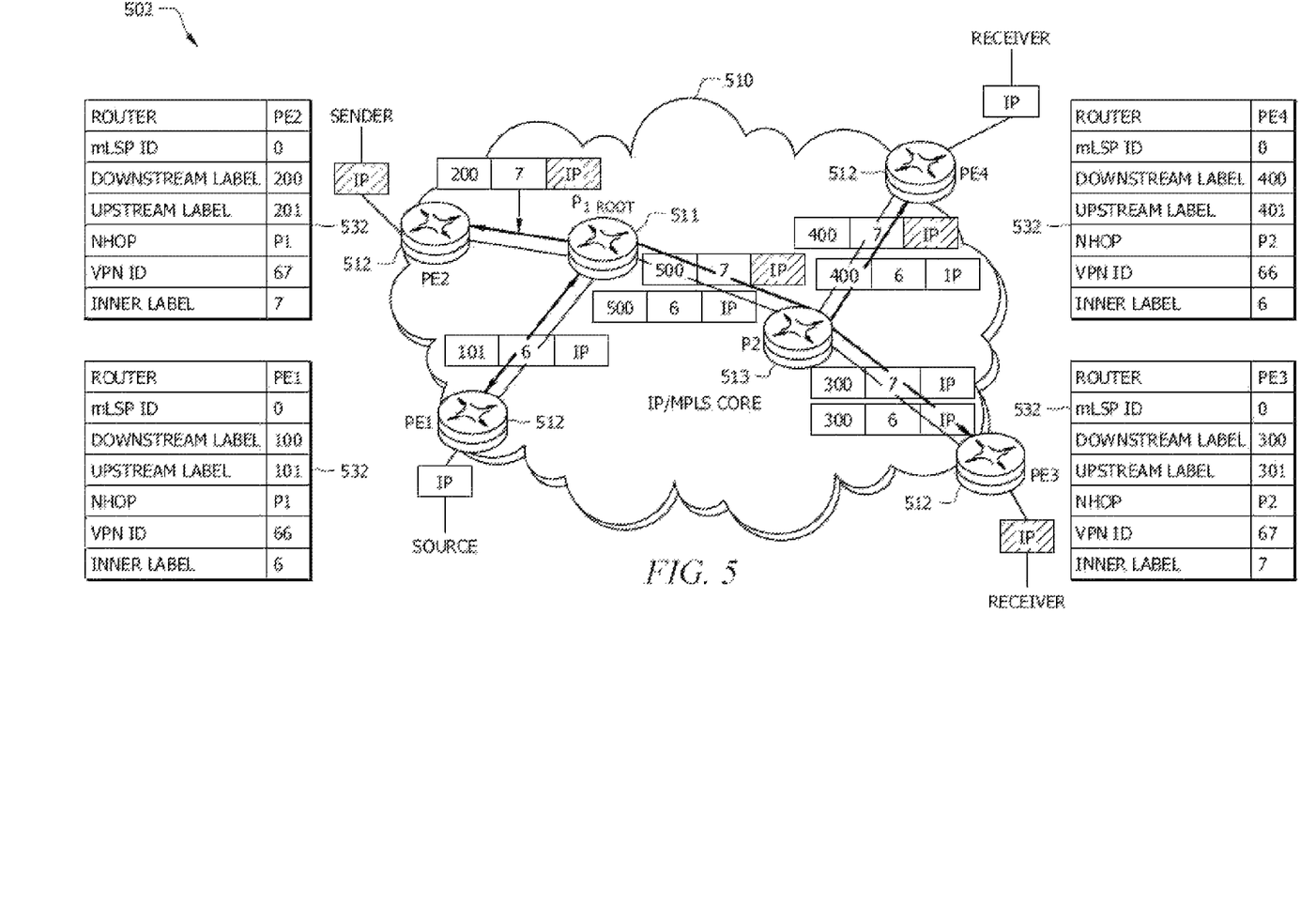
FIG. 5 is a schematic diagram of an embodiment of a multicast data forwarding scheme for multiple VPNs over a mLSP.

FIG. 5 illustrates an embodiment of a multicast data forwarding scheme 502 for multiple VPNs over a mLSP. For instance, different groupings of external networks that may be coupled to a MPLS core (via PE nodes) may have different VPNs. The mLSP be may be created across the MPLS core for establishing a MVPN, as described above, for each of the VPNs. Thus, the different VPNs may share the same mLSP. Each MVPN (or VPN) may be associated with a VPN ID and may be bound to a set of corresponding downstream and upstream labels corresponding to the PE nodes. Different PE nodes may be associated with different VPNs. However, The PE nodes may share the same mLSP and the same root node. The mLSP may be established between a root node 511 (labeled P1 root), a plurality of PE nodes 512 (labeled PE1, PE2, PE3, and PE4) in a MPLS core 510, and one or more intermediate nodes 513 (labeled P2), which may be configured similar to the corresponding components above.

After the mLSP is established, the root node 511 and the PE nodes 512 may maintain the bindings between the corresponding VPNs and the corresponding MPLS labels (downstream and upstream labels). The binding information for each PE node 512 (and similarly the root node 511) may be maintained in a corresponding local MPLS binding table 532 for each of the nodes. Multicast data may be forwarded over the mLSP, which may serve as a P2MP LSP or a MP2MP LSP. The MPLS binding table 532 for each PE node 512 may comprise a downstream label and an upstream label assigned to each individual PE node 512, a next hop (NHOP) address or indicator that indicates the next hop in the sub-LSP or branch for each PE node 512, and a VPN ID, which may indicate the corresponding VPN of the PE node 512.

Further, to allow the different VPNs to share the same mLSP in the MPLS core 510, the multicast data forwarding scheme 502 may use a dual-label forwarding model. Hence, the MPLS binding table 532 for each PE node 512 may also comprise an inner label, which may be forwarded in the multicast data packets (in addition to the upstream or downstream label) to associate traffic with the corresponding VPN. Since the inner label indicates the corresponding VPN of the PE node 512, the inner label may be the same for the PE nodes 512 that correspond to the same VPN. The inner label may be assigned by the root node 511, e.g., in the RESV message, for all the PE nodes 512 for all the VPNs involved. For example, the VPN ID may be 66 and the inner label may be 6 for PE1 and PE4 that are associated with a first VPN. The VPN ID may be 67 and the inner label may be 7 for PE2 and PE3 that are associated with a second VPN. Using different inner labels for different VPNs may allow the sharing of a single mLSP for multiple VPNs in the same MPLS core, and hence sharing the same network resources including the same root, PE nodes, and other intermediate nodes along the mLSP, the same links, and the same bandwidth. This may improve tree setup time and improve network efficiency, utilization, cost, and scalability.

In the multicast data forwarding scheme 502, the multicast packets may be forwarded along the mLSP nodes by swapping the labels similar to the multicast data forwarding scheme 402. However, the inner labels may be encapsulated in the incoming packets (form the external networks) by the PE nodes 512 before sending the packets upstream to the root node 511 and may be removed by the PE nodes 512 after receiving the packets downstream from the root node 511. The PE nodes 512 may then send the packets without the dual labels to the external networks. Thus, the use of labels may be transparent to the VPNs at the external networks.

For example, a data packet may arrive on PE1 (e.g., from a source in an external network that is not shown). Using a local MPLS binding table 532, PE1 may encapsulate the packet with its assigned upstream label (101) and the inner label (6) assigned for its VPN and forward the packet to the indicated next hop (P1 root) over the mLSP. The packet received at PE1 may comprise the source address, a multicast IP address, the mLSP ID, the VPN ID, or combinations thereof. When P1 root receives the packet, P1 root may swap the label with a downstream label for each of the next hops (using a local MPLS binding table), and then forward the packet to the next hops. The steps may be repeated at each next hop until the downstream PE nodes 512 receive the packet. The PE nodes 512 may then forward the packets (after removing the dual labels) to the VPN in the external networks if the inner label in the packets match the PE nodes' assigned inner label (in the local MPLS binding tables 532). Otherwise, the PE nodes 512 may discard the packets. For example, PE3 may discard a packet received downstream that comprises an inner label of 6.

Figure 6:
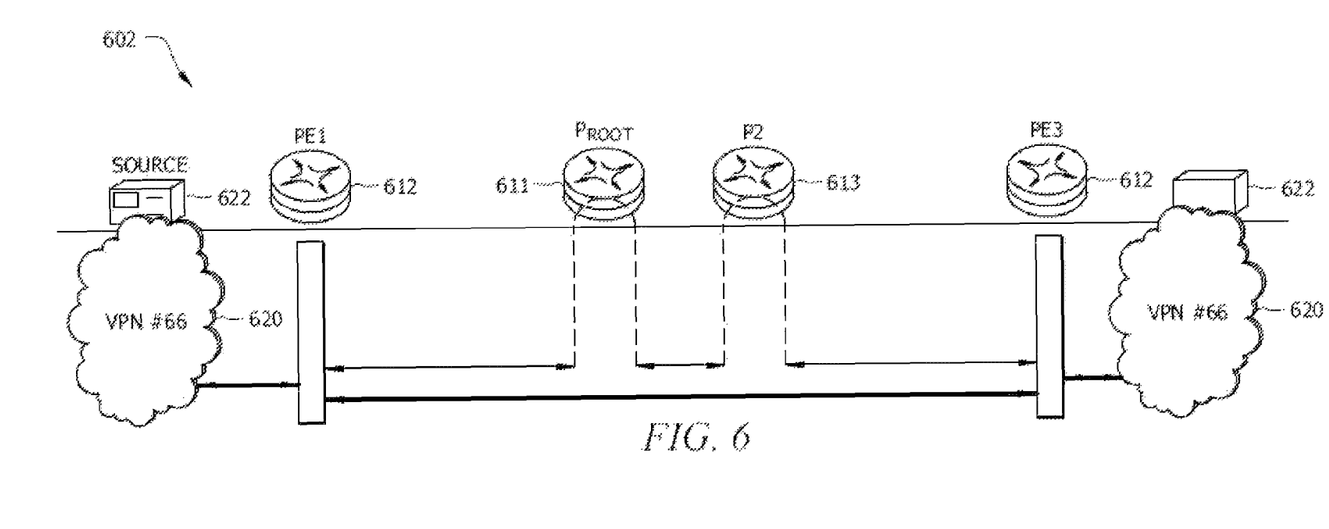
FIG. 6 is a schematic diagram of an embodiment of a PIM signaling scheme over a mLSP.

FIG. 6 illustrates an embodiment of a PIM signaling scheme 602 over a mLSP. The mLSP may be created in a MPLS core as described above (e.g., using scheme 302). The mLSP may comprise a root node 611 (P root), a plurality of PE nodes 612 (PE1 and PE3), and an intermediate node 613 (P2), which may all be located in a MPLS core. PE1 may be coupled to an external network 620 comprising a UE 622. PE3 may be coupled to a second external network 620 comprising a second UE 622. The mLSP connects a VPN (VPN #66) in the two external networks 620 across the MPLS core.

PIM messaging may be used between the two external networks 620 (e.g., between a source UE 622 and a receiver UE 622), for example to exchange control information. The scheme 602 may encapsulate or treat the incoming PIM messages from the external networks 620 as MPLS data packets and forward the packets according to the label forwarding based schemes above (e.g., scheme 402 or 502) along the mLSP. Specifically, a PE node 612 that receives a PIM message from a first external network 620 may process the message using an upstream label, as described above, and send the resulting MPLS packet to a next hop on the mLSP towards the root node 611. Each next hop may swap the label in the packet appropriately until the message is received at the PE node 612 on the downstream. The PE node 612 may then remove the label and forward the PIM message to a second external network 620. Thus, the PIM message may be transparent to the mLSP nodes and the forwarding scheme in the MPLS core. Dual labels may also be used (as described in scheme 502) in the case of multiple VPNs.

For example, PE3 may receive a PIM message from a VPN at a first external network 620. PE3 may encapsulate the PIM message as a MPLS packet and thus perform a lookup by VPN ID, encapsulate the packet with label and sends it to the next hop P2 of the mLSP. P2 may treat the packet as a MPLS packet, and thus swap the label in the packet and forward the packet to P root. P root and each next hop on the mLSP may repeat the process until the packet arrives to PE1. PE1 may then pop out (remove) the MPLS label from the packet and forward the PIM message (without labels) to VPN at a second external network 620.

Figure 7:
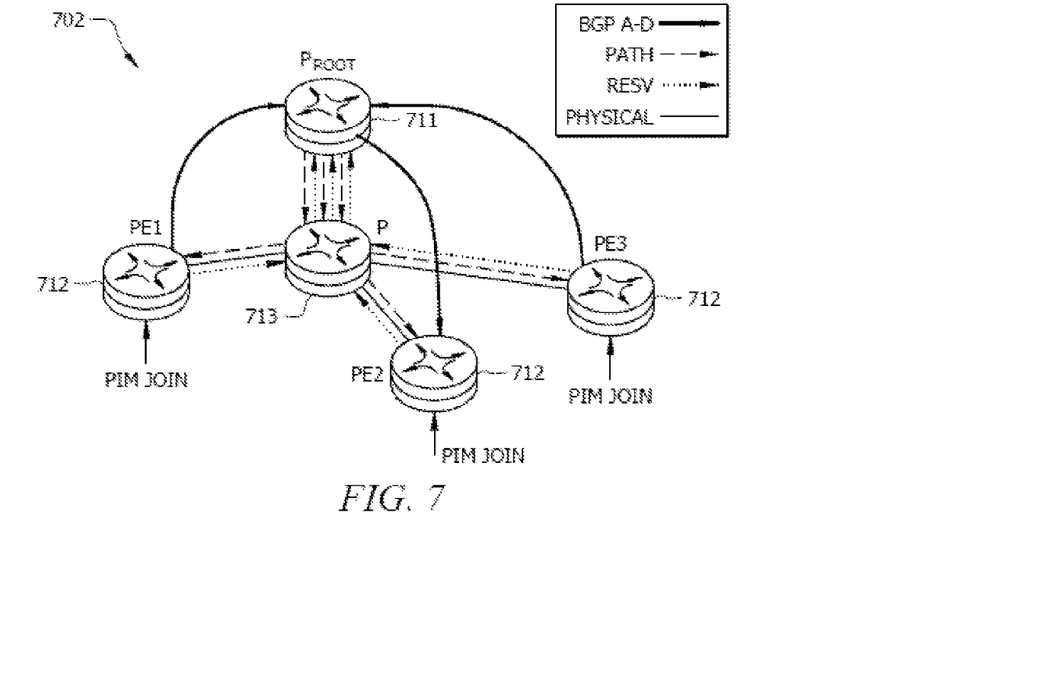
FIG. 7 is a schematic diagram of a message exchange for creating a mLSP using Resource Reservation Protocol-Traffic Engineering (RSVP-TE).
Figure 8:
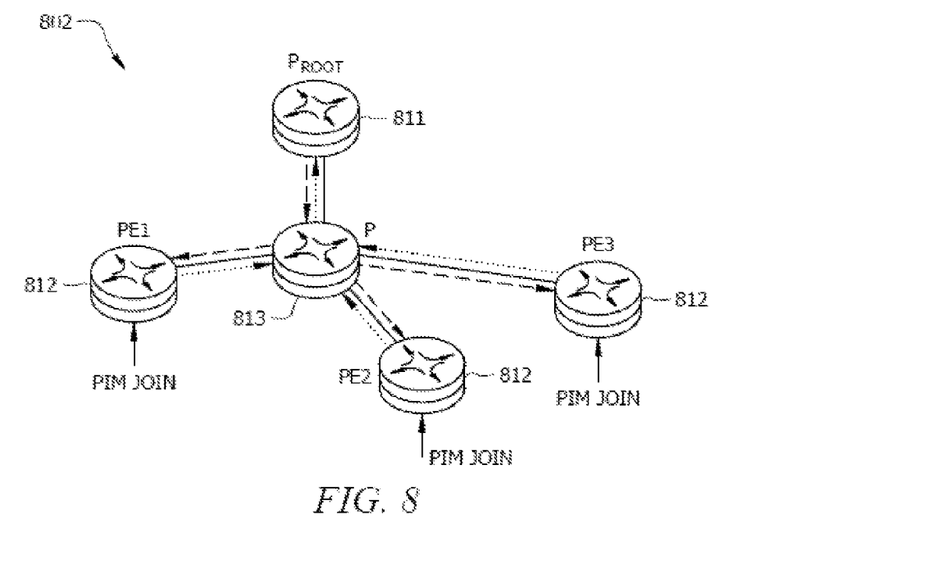
FIG. 8 is a schematic diagram of an embodiment of a message exchange for creating a mLSP using mRSVP-TE.

FIG. 7 illustrates a typical message exchange 702 for creating a mLSP using RSVP-TE. In comparison, FIG. 8 illustrates an embodiment of a message exchange 802 for creating a mLSP using mRSVP-TE. The message exchanges are indicated using a plurality of arrows. The message exchange 702 may be implemented between a root node 711 (P root), a plurality of PE nodes 712 (PE1, PE2, and PE3), and an intermediate node 713 (P) between the root node 711 and each of the PE nodes 712. The mLSP nodes may be located in a MPLS core. The message exchange 702 may comprise BGP messages (indicated by solid line arrows), PATH messages (indicated by bold dashed line arrows), RESV messages (indicated by dashed line arrows). Additionally, three PIM messages may be sent to the PE nodes 712 from the external networks (not shown) to request joining the MVPN.

In the RSVP-TE protocol, the BGP messages may also be needed to discover the PE nodes 712 and the PATH messages may be relayed from the root node 711 to each of the PE nodes 712 via the intermediate node 713. In return, the RESV messages may be relayed from each of the PE nodes 712 to the root node 711 via the intermediate node 713. Thus using RSVP-TE, a total of about 15 messages may be needed to create the mLSP between the root P root, P, PE1, PE2, and PE3. The messages may comprise three BGP messages exchanged between P root and PE1, PE2, and PE3 respectively, three PATH messages and three corresponding RESV messages exchanged between P root and P, and a pair of PATH and RESV messages exchange between P and each of PE1, PE2, and PE3.

The message exchange 802 may be implemented between a root node 811 (P root), a plurality of PE nodes 812 (PE1, PE2, and PE3), and an intermediate node 813 (P) between the root node 811 and each of the PE nodes 812. The mLSP nodes may be located in a MPLS core. Since the mRSVP-TE is receiver initiated (the LSP paths are initiated by the PE nodes 812 using PATH messages), the BGP protocol and messages may not be needed. Further, a single pair of PATH and RESV messages may be exchanged between the mLSP nodes. Further, PIM messages may be sent to the PE nodes 812 from the external networks (not shown) to request joining the MVPN. However, the mRSVP-TE based mLSP creation method may not need the PIM protocol to carry MVPN multicast routing information and multicast traffic. Since there are five mLSP nodes, the message exchange 802 may comprise four PATH messages (indicated by dashed line arrows) and four corresponding RESV messages (indicated by bold dashed line arrows). Thus, using the mRSVP-TE protocol, a total of about eight messages may be needed to create the mLSP between the root P root, P, PE1, PE2, and PE3. This is a reduction of about 47 percent in comparison to the RSVP-TE protocol.

Since more messages may be needed and hence more soft states may be maintained to create the mLSP using RSVP-TE versus mRSVP-TE, the RSVP-TE based mLSP creation may have slower setup time (to build the tree) and may be less scalable. The mRSVP-TE scheme may also have the advantage of allowing the use of default and data mLSP mechanisms for MVPN transport, which may simplify operation and improve network performance. For these reasons, the mRSVP-TE based mLSP creation may have better setup time, efficiency, utilization, and scalability than the RSVP-TE protocol.

Figure 9:
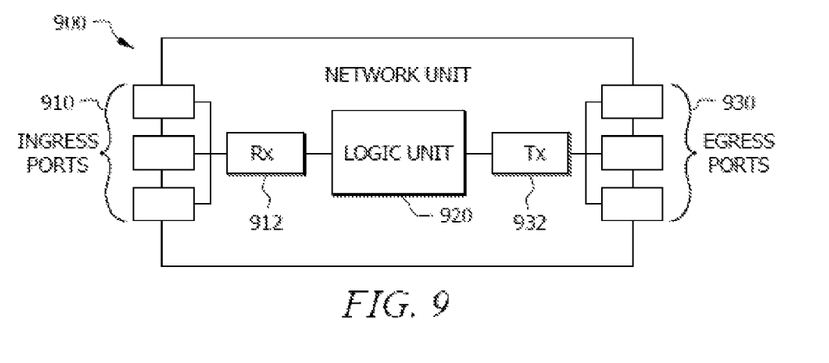
FIG. 9 is a schematic diagram of an embodiment of a network unit.

FIG. 9 illustrates an embodiment of a network unit 900, which may be located at or coupled to any of the components described above. For example, the transmitter/receiver unit 900 may be located at or coupled to the root nodes, the PE nodes, the intermediate nodes of the mLSP or any of the network nodes described above. The network unit 900 may be any device that transports data through the network. For instance, the transmitter/receiver unit 900 may correspond to or may be located in any of the network nodes described above, e.g., the first node 210 and the second node 220. The network unit 900 may comprise one or more ingress ports or units 910 coupled to a receiver (Rx) 912 for receiving signals and packets/data from other network components. The network unit 900 may comprise a logic unit 920 to determine which network components to send data to. The logic unit 920 may be implemented using hardware, software, or both. The network unit 900 may also comprise one or more egress ports or units 930 coupled to a transmitter (Tx) 932 for transmitting signals and packets/data to the other network components. The receiver 912, logic unit 920, and transmitter 932 may also implement or support the schemes and methods described above for creating the mLSP and/or forwarding the data using the mLSP. For instance, the receiver 912, logic unit 920, and transmitter 932 may be configured (via hardware and/or software) to implement or support the schemes 102, 402, 502, 602, the method 302, the message exchange 802, or combinations thereof.

Figure 10:
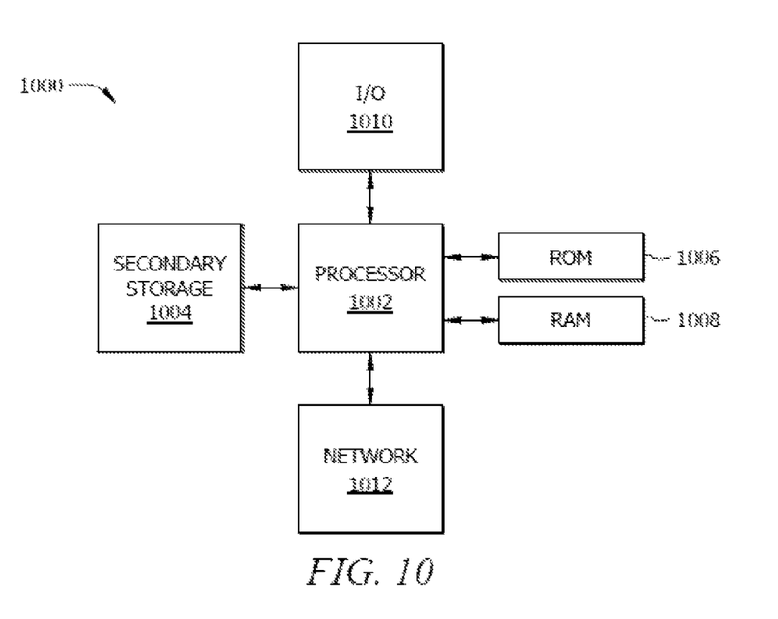
FIG. 10 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs) and/or digital signal processors (DSPs). The processor 1002 may be configured to implement any of the schemes and methods described above for creating the mLSP and/or forwarding the data using the mLSP. For instance, the processor 1002 may be configured (via hardware and/or software) to implement or support the schemes 102, 402, 502, 602, the method 302, the message exchange 802, or combinations thereof.

The secondary storage 1004 is typically comprised of one or more disk drives or erasable programmable ROM (EPROM) and is used for non-volatile storage of data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. In a network node positioned inside a Multiprotocol Label Switching (MPLS) core network, a method of establishing a multicast Virtual Private Network (MVPN) comprising:
   establishing a multicast Label Switched Path (mLSP) in the MPLS core network using a multicast Resource Reservation Protocol-Traffic Engineering (mRSVP-TE) and without using a Border Gateway Protocol (BGP) to discover one or more edge nodes, wherein the network node is a root node of the mLSP established in the MPLS core network;
   receiving a packet for multicast data from a Virtual Private Network (VPN) via a provider edge (PE) node positioned on the edge of the MPLS core network, wherein the PE node is a leaf node of the mLSP established in the MPLS core network;
   swapping an upstream label in the packet that is assigned to the PE node with a downstream label assigned to a next hop of the mLSP; and
   forwarding the packet to the next hop of the mLSP.

2. The method of claim 1 further comprising:
   prior to receiving the packet from the PE node, establishing at least a part of the mLSP by receiving a multicast Resource Reservation Protocol-Traffic Engineering (mRSVP-TE) PATH message from the PE node to join the mLSP, wherein the mRSVP-TE PATH message comprises a downstream label assigned to the PE node and a VPN identifier (ID) associated with the VPN;
   assigning the upstream label for the PE node;
   accessing a local label binding table that binds VPN ID with a mLSP ID that identifies the mLSP, and the downstream label and the upstream label for the PE node; and
   returning a mRSVP-TE RESV message to the PE node that comprises the upstream label.

3. The method of claim 2, wherein the PATH message and the RESV message are exchanged with the PE node via an intermediate node in the MPLS core network that belongs to the mLSP.

4. The method of claim 3 further comprising:
   receiving from the intermediate node a packet comprising a label assigned to the intermediate node;
   swapping the label in the packet with a downstream label assigned to the next hop of the mLSP; and
   forwarding the packet to the next hop of the mLSP.

5. The method of claim 2, wherein the mRSVP-TE PATH message and the mRSVP-TE RESV message comprise a VPN ID associated with the mLSP, a multicast group address for a plurality of sources and receivers of the VPN, and a source address for a source of multicast data in the VPN.

6. In a network node positioned inside a Multiprotocol Label Switching (MPLS) core network, a method of establishing a multicast Virtual Private Network (MVPN) comprising:
- receiving a packet for multicast data from a Virtual Private Network (VPN) via a provider edge (PE) node positioned on the edge of the MPLS core network, wherein the network node is a root node and the PE node is a leaf node of a multicast Label Switched Path (mLSP) established in the MPLS core network;
- swapping an upstream label in the packet that is assigned to the PE node with a downstream label assigned to a next hop of the mLSP;
- forwarding the packet to the next hop;
- prior to receiving the packet from the PE node, receiving a multicast Resource Reservation Protocol-Traffic Engineering (mRSVP-TE) PATH message from the PE node to join the mLSP, wherein the mRSVP-TE PATH message comprises a downstream label assigned to the PE node and a VPN identifier (ID) associated with the VPN;
- assigning the upstream label for the PE node;
- binding the VPN ID with the downstream label and the upstream label for the PE node;
- returning a mRSVP-TE RESV message to the PE node that comprises the upstream label;
- assigning an inner label for the VPN;
- binding the VPN ID with the inner label; and
- forwarding the inner label to the PE node in the mRSVP-TE RESV message.

7. In a network node positioned on the edge of a Multiprotocol Label Switching (MPLS) core network, a method of establishing a multicast Virtual Private Network (MVPN) comprising:
- establishing a multicast Label Switched Path (mLSP) in the MPLS core network using a multicast Resource Reservation Protocol-Traffic Engineering (mRSVP-TE) and without using a Border Gateway Protocol (BGP) to discover the network node positioned on the edge of the MPLS core network;
- receiving a packet for multicast data from a Virtual Private Network (VPN);
- adding an upstream label to the packet that is assigned to the network node by a second network node positioned inside the MPLS core network, wherein the network node is a leaf node and the second network node is a root node of the mLSP established in the MPLS core network; and
- forwarding the packet to a next hop of the mLSP.

8. The method of claim 7 further comprising:
- prior to receiving the packet, sending a mRSVP-TE PATH message to the root node, wherein the mRSVP PATH message comprises a downstream label for the provider edge (PE) node and a VPN identifier (ID) associated with the VPN;
- receiving a mRSVP-TE RESV message from the root node that indicates the upstream label assigned for the PE node; and
- accessing a local label binding table that binds the VPN ID with the a mLSP ID that identifies the mLSP, the downstream label, and the upstream label.

9. The method of claim 8, wherein the mRSVP-TE PATH message and the mRSVP-TE RESV message are exchanged with the root node via an intermediate node in the MPLS core network that belongs to the mLSP.

10. The method of claim 8, wherein the mRSVP-TE PATH message and the mRSVP-TE RESV message comprise a mLSP ID associated with the mLSP, a multicast group address for a plurality of sources and receivers of the VPN, and a source address for a source of multicast data in the VPN.

11. The method of claim 7 further comprising adding an inner label assigned for the VPN to the packet before forwarding the packet to the next hop.

12. The method of claim 7 further comprising:
- receiving on the mLSP a packet comprising a downstream label assigned to the network node;
- removing the downstream label from the packet; and
- forwarding the packet to the VPN.

13. The method of claim 12 further comprising removing an inner label assigned for the VPN from the packet before forwarding the packet to the VPN.

14. In a network node positioned on the edge of a Multiprotocol Label Switching (MPLS) core network, a method of establishing a multicast Virtual Private Network (MVPN) comprising:
- receiving a packet for multicast data from a Virtual Private Network (VPN);
- adding an upstream label to the packet that is assigned to the network node by a second network node positioned inside the MPLS core network, wherein the network node is a leaf node and the second network node is a root node of a multicast Label Switched Path (mLSP) established in the MPLS core network;
- forwarding the packet to a next hop of the mLSP;
- prior to receiving the packet, sending a multicast Resource Reservation Protocol-Traffic Engineering (mRSVP-TE) PATH message to the root node, wherein the mRSVP PATH message comprises a downstream label for the provider edge (PE) node and a VPN identifier (ID) associated with the VPN;
- receiving a mRSVP-TE RESV message from the root node that indicates the upstream label assigned for the PE node;
- binding the VPN ID with the downstream label and the upstream label;
- receiving an inner label assigned for the VPN in the mRSVP-TE RESV message; and
- binding the VPN ID with the inner label.

15. A network component for supporting a multicast Virtual Private Network (MVPN) in a Multiprotocol Label Switching (MPLS) core network, the network component comprising:
- a transmitter;
- a receiver;
- a processor coupled to the transmitter and receiver, wherein the transmitter, the receiver, and the processor cause the network component to perform the following:
  - receive a packet for multicast data from a Virtual Private Network (VPN) via a provider edge (PE) node positioned on the edge of the MPLS core network, wherein the network component and the PE node belong to a multicast Label Switched Path (mLSP) established in the MPLS core network;
  - swap an upstream label in the packet that is assigned to the PE node with a downstream label assigned to a next hop of the mLSP; and
  - forward the packet to the next hop of the mLSP,
- wherein the mLSP is created using a multicast Resource Reservation Protocol-Traffic Engineering (mRSVP-TE) and without using a Border Gateway Protocol (BGP) to discover one or more edge nodes.

16. The network component of claim 15, wherein the mLSP is configured for point-to-multipoint (P2MP) multicast traffic distribution, and wherein traffic is multicast between multiple external networks coupled via a plurality of edge nodes to the MPLS core network using a MPLS packet that is forwarded between the edge nodes via the network component and the mLSP.

17. The network component of claim 15, wherein the mLSP is configured for multipoint-to-multipoint (MP2MP) multicast traffic distribution, and wherein traffic is multicast between multiple external networks coupled via a plurality of edge nodes to the MPLS core network using multiple MPLS packets that are forwarded between the edge nodes via the network component and the mLSP.

18. The network component of claim 15, wherein the same mLSP is configured to connect a plurality of VPNs across a plurality of external networks coupled via a plurality of edge nodes to the MPLS core network and that are associated with different groupings of the edge nodes and assigned different VPN identifiers (IDs), and wherein the VPN IDs are associated with a plurality of corresponding inner labels that are used in a plurality of forwarded MPLS packets along the mLSP to distinguish different traffic for the different VPNs.

19. The network component of claim 15, wherein the transmitter, the receiver, and the processor further cause the network component to access a local label binding table that binds a Virtual Private Network (VPN) identifier (ID) of a VPN, a mLSP ID for the mLSP, a corresponding upstream label, and the downstream label.

20. A network component for supporting a multicast Virtual Private Network (MVPN) in a Multiprotocol Label Switching (MPLS) core network, the network component comprising:
   a transmitter;
   a receiver;
   a processor coupled to the transmitter and receiver, wherein the transmitter, the receiver, and the processor cause the network component to perform the following:
      receive a packet for multicast data from a Virtual Private Network (VPN) via a provider edge (PE) node positioned on the edge of the MPLS core network, wherein the network component and the PE node belong to a multicast Label Switched Path (mLSP) established in the MPLS core network;
      swap an upstream label in the packet that is assigned to the PE node with a downstream label assigned to a next hop of the mLSP; and
      forward the packet to the next hop,
   wherein the mLSP is created using multicast Resource Reservation Protocol-Traffic Engineering (mRSVP-TE) and without using a Protocol-Independent Multicast (PIM) over the MPLS core network.

21. A network component for supporting a multicast Virtual Private Network (MVPN) in a Multiprotocol Label Switching (MPLS) core network, the network component comprising:
   a transmitter;
   a receiver;
   a processor coupled to the transmitter and receiver, wherein the transmitter, the receiver, and the processor cause the network component to perform the following:
      access a local label binding table that binds a Virtual Private Network (VPN) identifier (ID) of a VPN, a multicast Label Switched Path (mLSP) ID for the mLSP, a corresponding upstream label, and a corresponding downstream label;
      receive a packet for multicast data from the VPN;
      add an upstream label to the packet that is assigned to the network component by a root node positioned inside the MPLS core network, wherein the network component and the root node belong to the mLSP established in the MPLS core network; and
      forward the packet to a next hop of the mLSP.

22. The network component of claim 21, wherein multicast data from a plurality of external networks coupled to the MPLS network is encapsulated and forwarded using MPLS packets via the network component and the mLSP and is transparent to the MPLS core network's internal nodes.

23. The network component of claim 21, wherein Protocol-Independent Multicast (PIM) data from a plurality of external networks coupled to the MPLS network is encapsulated and forwarded using MPLS packets via the network component and the mLSP and is transparent to the MPLS core network's internal nodes.

24. The network component of claim 21, wherein the mLSP is created using a multicast Resource Reservation Protocol-Traffic Engineering (mRSVP-TE) and without using a Border Gateway Protocol (BGP) to discover one or more edge nodes.

* * * * *

UNITED STATES PATENT AND TRADEMARK OFFICE
CERTIFICATE OF CORRECTION

| | | |
|---|---|---|
| PATENT NO. | : 8,958,423 B2 | |
| APPLICATION NO. | : 13/539150 | |
| DATED | : February 17, 2015 | |
| INVENTOR(S) | : Katherine Zhao et al. | |

It is certified that error appears in the above-identified patent and that said Letters Patent is hereby corrected as shown below:

In the Claims

Column 12 Line 48, Claim 2 should read:

The method of claim 1 further comprising:
prior to receiving the packet from the PE node, establishing at least a part of the mLSP by receiving a multicast Resource Reservation Protocol-Traffic Engineering (mRSVP-TE) PATH message from the PE node to join the mLSP, wherein the mRSVP-TE PATH message comprises a downstream label assigned to the PE node and a VPN identifier (ID) associated with the VPN;
assigning the upstream label for the PE node;
accessing a local label binding table that binds the VPN ID with a mLSP ID that identifies the mLSP, and the downstream label and the upstream label for the PE node; and
returning a mRSVP-TE RESV message to the PE node that comprises the upstream label.

Signed and Sealed this
Twenty-first Day of July, 2015

Michelle K. Lee
*Director of the United States Patent and Trademark Office*